United States Patent
Ito et al.

[11] Patent Number: 5,353,162
[45] Date of Patent: Oct. 4, 1994

[54] ZOOM LENS SYSTEM

[75] Inventors: Takayuki Ito; Sachio Hasushita, both of Tokyo, Japan

[73] Assignee: Asahi Kogaku Kogyo Kabushiki Kaisha, Tokyo, Japan

[21] Appl. No.: 907,791

[22] Filed: Jul. 2, 1992

[30] Foreign Application Priority Data

Jul. 4, 1991 [JP] Japan .................. 3-261483

[51] Int. Cl.$^5$ .................................. G02B 15/14
[52] U.S. Cl. .................... 359/692; 359/708
[58] Field of Search ........... 359/692, 708, 687, 690, 359/688

[56] References Cited

U.S. PATENT DOCUMENTS

| | | | |
|---|---|---|---|
| 4,720,179 | 1/1988 | Ito | 359/692 |
| 4,818,081 | 4/1989 | Ito | 359/692 |
| 4,911,539 | 3/1990 | Tsunashima et al. | 359/692 |
| 5,071,235 | 12/1991 | Mori et al. | 359/692 |

FOREIGN PATENT DOCUMENTS 64-57222 3/1989 Japan.

*Primary Examiner*—Scott J. Sugarman
*Attorney, Agent, or Firm*—Sughrue, Mion, Zinn, Macpeak & Seas

[57] ABSTRACT

A zoom lens system having a zoom ratio of approximately 2 that is used with a compact camera. The system's overall lens length at the telephoto end is shorter than its focal length at the telephoto end, and it experiences small variations in aberrations during zooming. The present zoom lens system comprises, in order from the object side, a positive first lens group and a negative second lens group, which adjust the magnification by varying the distance therebetween. This lens system satisfies the following conditions:

$$1.59 < fw/f1 < 2.0 \quad (1) \text{ and}$$

$$1.79 < fw/|f2| < 2.5 \quad (2);$$

where fw represent the focal length of the overall system at the wide-angle end; f1 represents the focal length of the first lens group and f2 represents the focal length of the second lens group (f2<0).

8 Claims, 10 Drawing Sheets

ZOOM LENS SYSTEM

BACKGROUND OF THE INVENTION

This application is based on and claims priority from Japanese Application No. P03-261483 filed Jul. 4, 1991, the disclosure of which is incorporated by reference herein.

The present invention relates to a mechanically simplified two-group lens system of the telephoto type. Particularly, it relates to a zoom lens system that is used with a compact camera and that has a shorter back focus than that of the zoom lens system of a single-lens reflex camera.

Conventional two-group zoom lens systems, which have been used with compact cameras, have a zoom ratio of about 2. These conventional zoom lens systems have an overall lens length (i.e. the distance between the lens surface closest to the object and the image plane) at the narrow-angle or telephoto end that is longer than the focal length at the telephoto end.

However, if a zoom lens system, having an overall length that is greater than its focal length, is assembled in a camera, the overall equipment size cannot be made satisfactorily compact. Moveover, when the zoom lens system's overall size is reduced, each of the lens groups must be provided with more power. However, if the power of each lens group is increased, greater variations in aberrations will occur during a zooming operation.

SUMMARY OF THE INVENTION

An object of the present invention is to provide a zoom lens system, having a zoom ratio of approximately 2, that is to be used with a compact camera, wherein the system's overall lens length at the telephoto end is shorter than the focal length at the telephoto end, and which experiences only small variations in aberrations during zooming.

The present invention offers a compact zoom lens system whose overall lens length is smaller than its focal length at the telephoto end. This advantage is attained by designing first and second lens groups in such a way that their powers lie within specified ranges.

The present invention offers another advantage in that by modifying the lens composition or using aspheric surfaces, the variations that would otherwise take place in the various aberrations ranging from spherical aberration to distortion if the zoom lens system were made compact can be reduced to acceptably small levels.

The present zoom lens system comprises, in order from the object side, a positive first lens group and a negative second lens group. The invention adjusts magnification by varying the distance between the first and the second lens groups. To obtain the above noted objects, the invention, as illustrated in the preferred embodiments, satisfies one or more of twelve conditions set forth below.

BRIEF DESCRIPTION OF THE DRAWINGS

The invention will be more clearly understood from the following description in conjunction with the accompanying drawings, wherein:

FIG. 3 is a set of graphs plotting the aberration curves obtained with the zoom lens system of Example 1 at the telephoto end;

DETAILED DESCRIPTION OF THE PREFERRED EMBODIMENTS

The zoom lens system of the present invention which is capable of attaining the above-stated object comprises, in order from the object side, a positive first lens group and a negative second lens group. The invention adjusts magnification by varying the distance between the first and the second lens groups. The invention satisfies the following conditions:

$$1.59 < fw/f1 < 2.0 \qquad (1)$$

$$1.79 < fw/|f2| < 2.5 \qquad (2)$$

where fw represents the focal length of the overall system when at the wide-angle end; f1 represents the focal length of the first lens group; and f2 represents the focal length of the second lens group (f2<0).

Several examples of the present invention are described below. Each of the exemplary lens systems comprises, in order from the object side, a positive first lens group and a negative second lens group, and satisfies the above-stated conditions (1) and (2).

Conditions (1) and (2) relate to the power of the first and the second lens groups. By making the powers of the respective lens groups much stronger than the power of the overall system, the present zoom lens system can be used with a compact camera that has a smaller overall lens length than the focal length at the telephoto end. If the upper limit of each condition is exceeded, the power of each lens group becomes excessive and aberrations will vary so substantially during zooming that it will become difficult to correct the aberrations effectively over the entire zoom range. If the lower limit of either condition is not reached, the overall system increases in size and is no longer compact.

Each exemplary lens system also satisfies the following condition:

$$0.09 < \Delta L/(ft-fw) < 0.25 \qquad (3)$$

where $\Delta L$ represents the amount of variation in the distance between the first and the second lens groups during zooming; and ft represents the focal length of the overall system at the telephoto end.

Condition (3) specifies the amount of variation in the distance between the first and the second lens groups when the focal length of the overall system varies by 1 mm. If the upper limit of condition (3) is exceeded, the power of each lens group decreases, thereby increasing the amount of lens movement necessary for zooming. This increased motion makes it impossible to obtain a compact overall system. If the lower limit of condition (3) is not reached, the power of each lens group becomes excessive, causing increased variations in aberrations during zooming.

Preferably, the first lens group comprises, in order from the object side, a positive meniscus lens element having a convex convergent surface with a small radius of curvature that is directed toward the object and a positive lens element having a convex convergent surface with a small radius of curvature directed toward the image plane. The first group further includes a positive cemented lens that includes positive and negative lens elements, each of which is cemented at a concave divergent surface that has a small radius of curvature directed toward the object. The first lens group satisfies the following conditions:

$$0.25 < r1/fw < 0.7 \qquad (4)$$

$$-0.7 < r3/fw < -0.25 \qquad (5)$$

$$-0.9 < r6/fw < -0.25 \qquad (6)$$

$$-0.5 < rc/fw < -0.15 \qquad (7)$$

where ri represents the radius of curvature of the i-th surface as counted from the object side; and rc represents the radius of curvature of the surface at which the two lens elements are cemented together. When the first lens group is constructed with large power, the lens elements therein, that have positive and negative surfaces with strong power, are positioned in an alternating order of convex, concave, convex and concave.

Conditions (4)–(7) specify the radii of curvature of lens surfaces with the stronger power in the first lens group. If the upper limit of condition (4) is exceeded, or the lower limit of condition (5) is not reached, or the upper limit of condition (6) is exceeded, or the lower limit of condition (7) is not reached, the power of the associated lens surface becomes excessive. Thus, higher-order aberrations will result and lens manufacturing will also become difficult from a geometric viewpoint. In the opposite case (i.e., if the lower limit of condition (4) is not reached, or the upper limit of condition (5) is exceeded, or the lower limit of condition (6) is not reached, or the upper limit of condition (7) is exceeded), it is difficult to attain balance between aberrations within the first lens group when the first lens element is adjusted to have a strong power.

The smaller the size of the overall system, the higher the magnification of the second lens group. Hence, unless aberrations, particularly spherical aberration, which occur in the first lens group are suppressed, greater variations will occur in the spherical aberration during zooming. For effective correction of the spherical aberration, an aspheric surface that is divergent with respect to the paraxial curvature radius is preferable provided in the first lens group. Particularly, each of the lens systems according to Examples 1, 2, 4 and 5 includes within the first lens group an aspheric lens element that satisfies the following condition:

$$-30 < \Delta I1 < 0 \qquad (8)$$

where $\Delta I1$ is the amount of variation in the coefficient of spherical aberration due to the aspheric surface in the first lens group for the case where the overall focal length at the wide-angle end is calculated as unity. Condition (8) specifies the action of the aspheric lens element. If the upper limit of condition (8) is exceeded, the effectiveness of the aspheric surface will decrease. If the lower limit of condition (8) is not reached, the spherical aberration is overcorrected and higher-order aberrations occur.

The second lens group comprises, in order from the object side, a positive meniscus lens element having a convex surface directed toward the image plane and two negative meniscus lens elements having a concave surface directed toward the object. The second lens group satisfies the following conditions:

$$-0.7 < r2/fw < -0.25 \qquad (9)$$

$$-0.7 < r23/fw < -0.19 \qquad (10)$$

$$-0.7 < r25/fw < -0.19 \qquad (11)$$

where r2i is the radius of curvature of the ith surface in the second lens group as counted from the object side.

If the upper limits of conditions (9)–(10) are exceeded, the radii of curvature of the associated lens surfaces become excessive and higher-order aberrations result. Conversely, if the lower limits of those conditions are not reached, it becomes difficult to attain a balance between aberrations that are caused by the respective lens surfaces when the second lens group is adjusted to have a great power.

The more compact the overall system, the greater the chance that a positive distortion will occur, especially when the camera is at the wide-angle end. However, this distortion can be effectively corrected by providing an aspheric surface in the second lens group. Most advantageously, the concave surface, that is directed toward the object, of the first lens element which is closest to the object, is designed to be aspheric. This aspheric surface placement provided easy lens manufacturing and only allows small aberration variations, even when manufacturing errors occur.

Under the above circumstances, each of the lens systems according to examples 2, 3, 4 and 5 is constructed such that the concave surface of the positive meniscus lens element in the second lens group, which is directed toward the object, is an aspheric surface satisfying the following condition:

$$0 < \Delta V2 < 0.2 \quad (12)$$

where $\Delta V2$ is the amount of variation in the coefficient of distortion due to the aspheric surface in the second lens group for the case where the overall focal length at the wide-angle end is calculated as unity.

Condition (12) specifies the action of the aspheric surface in the second lens group. If the upper limit of this condition is exceeded, the astigmatism is overcorrected, upsetting the balance between variations. If the lower limit of condition (12) is not reached, the effectiveness of the aspheric surface becomes so small that it is difficult to effectively correct the distortion.

The positive meniscus lens element in the second lens group can be adjusted to have a comparatively small power. Hence, it can be made of a plastic material without being adversely affected by changes in temperature or humidity. Advantages of using a plastic lens are low cost and ease in producing an aspheric surface by machining.

The discussion hereafter addresses the amount of variation in the coefficient of the third-order aberration due to an aspheric surface. The shape of an aspheric surface can generally be expressed by equation (1):

$$x = \frac{cy^2}{1 + \sqrt{(1 - (1 + K)c^2 y^2)}} + a_4 y^4 + a_6 y^6 + a_8 y^8 + a_{10} y^{10} \quad (1)$$

where x is the distance between a point on the aspheric surface and a plane tangent to the vertex of the aspheric surface; y represents the distance between the optical axis and the point on the aspheric surface; c represents the curvature (1/r) of the vertex of the aspheric surface; K denotes the conic constant; and $a4$, $a6$, $a8$ and $a10$ are the aspheric coefficients of the fourth, sixth, eighth and tenth order variables, respectively.

By calculating the focal length as $f=1.0$, namely, by substituting $X=x/f$, $Y=y/f$, $C=fc$, $A4=f^3 a4$, $A6=f^5 a6$, $A8=f^7 a8$ and $A10=f^9 a10$ into equation (1), the following equation (2) is obtained:

$$X = \frac{CY^2}{1 + \sqrt{(1 - (1 + K)C^2 Y^2)}} + A4Y^4 + A6Y^6 + A8Y^8 + A10Y^{10} \quad (2)$$

The second and subsequent terms of equation (2) define the amount of asphericity. The relationship between the coefficient A4 of the second term and the third-order aspheric coefficient $\phi$ is expressed by:

$$\phi = 8(N' - N)A4;$$

where N represents the refractive index of the medium before the aspheric surface and N' denotes the refractive index of the medium after the aspheric surface. The aspheric coefficient $\phi$ provides the following amounts of variation in third-order aberration coefficients:

$\Delta I = h^4 \phi$
$\Delta II = h^3 h' \phi$
$\Delta III = h^2 h'^2 \phi$
$\Delta IV = h^2 h'^2 \phi$
$\Delta V = h h'^3 \phi$ where I represents the spherical aberration coefficient; II represents the coma coefficient; III represents the astigmatism coefficient; IV represents the sagittal field curvature coefficient; V represents the distortion coefficient; h represents the height of paraxial on-axis rays at which they pass through each lens surface; and h' represent the height of paraxial off-axis rays passing through the center of the pupil, at which they pass through each lens surface.

The shape of an aspheric surface can be expressed in various other ways such as by using the conic constant or odd-order terms. However, if y is smaller than the paraxial radius of curvature, satisfactory approximation can be achieved by even-order terms alone.

EXAMPLE 1

Figure 1:
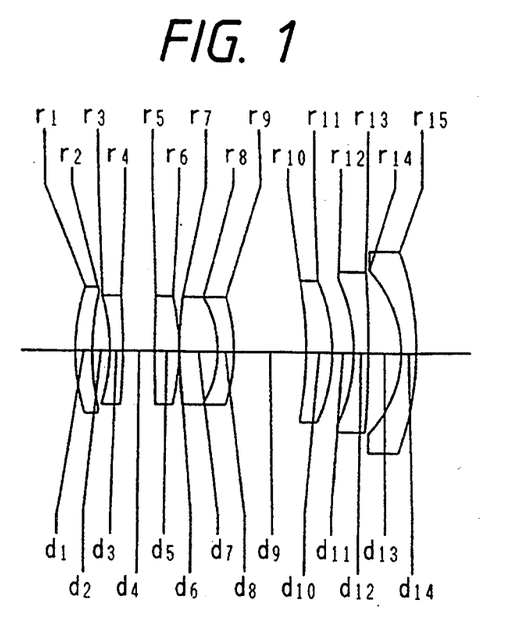
FIG. 1 is a simplified cross-sectional view showing the zoom lens system of Example 1 at the wide-angle end.
Figure 2:
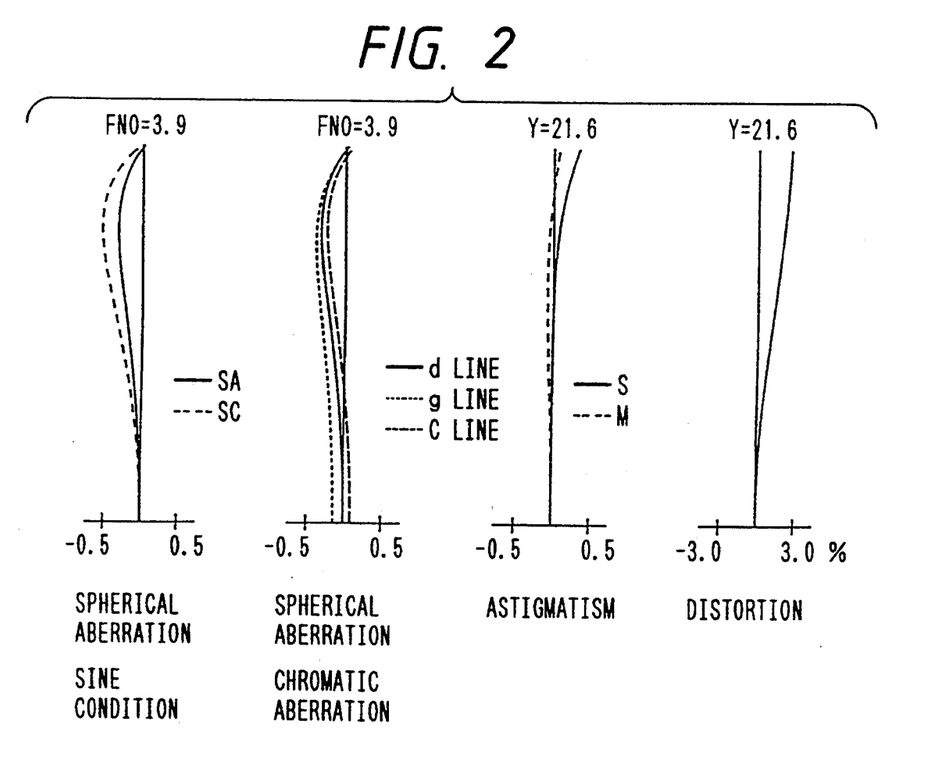
FIG. 2 is a set of graphs plotting the aberration curves obtained with the zoom lens system of Example 1 at the wide-angle end.
Figure 3:
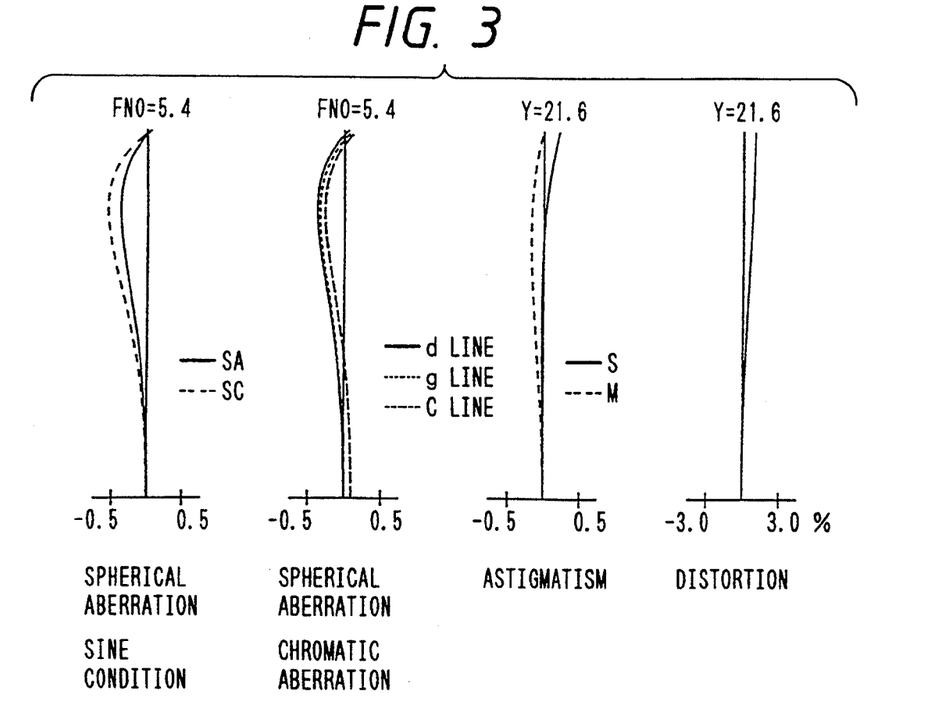
FIG. 3 is a set of graphs plotting the aberration curves obtained with the zoom lens system of Example 1 at the middle-angle end.
Figure 4:
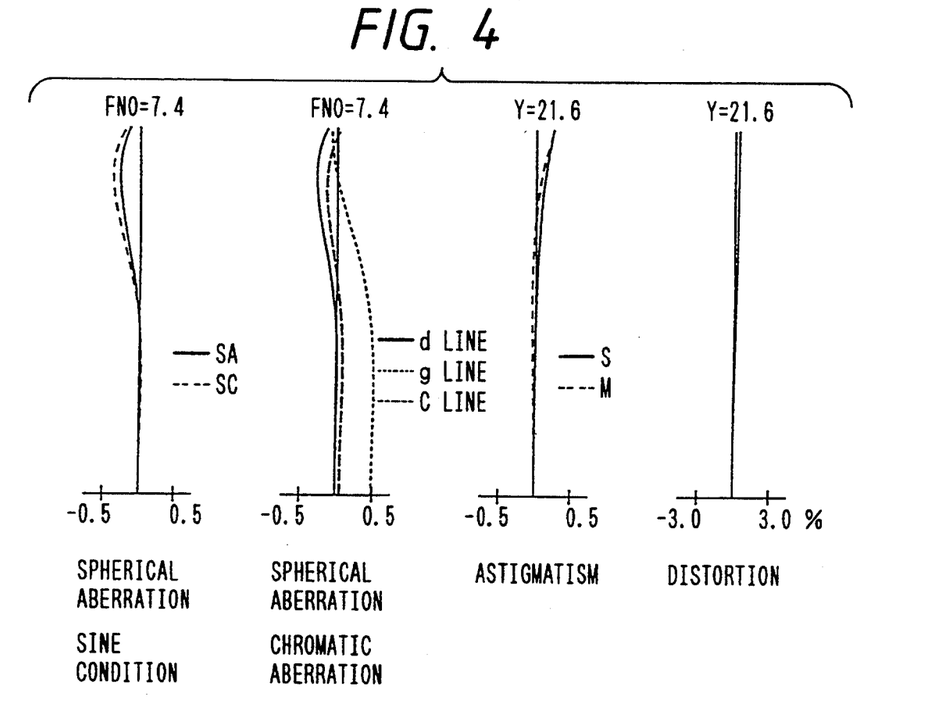

FIG. 1 shows the zoom lens system according to example 1 of the present invention. Specific numerical data for this system are given in Tables 1 and 2. FIGS. 2, 3 and 4 are graphs plotting the aberration curves obtained with this system at the wide-angle end, the middle-angle end and the telephoto end, respectively. In Tables 1 and 2, r denotes the radius of curvature of an individual lens surface, d denotes the airspace between lens surfaces, N denotes the refractive index, $\nu$ denotes the Abbe number, f denotes the focal length, fb denotes the back focus, FNo. denotes the aperture ratio, and $\omega$ denotes the half view angle.

The second surface in the lens system is aspheric. The aspheric surface is expressed by equation (2) and the conic constant K and aspheric coefficients A4, A6, A8 and A10 are listed in Table 3. The radius of curvature of the aspheric surface as it appears in Table 1 is that of the vertex of the aspheric surface.

TABLE 1

| Surface No. | r | d | n | $\nu$ |
|---|---|---|---|---|
| 1 | 18.875 | 1.65 | 1.73077 | 40.5 |
| 2 | 26.528 | 1.61 | | |
| 3 | −16.859 | 1.20 | 1.76182 | 26.5 |
| 4 | −55.664 | 2.95 | | |
| 5 | 230.952 | 2.23 | 1.57501 | 41.5 |
| 6 | −21.621 | 0.10 | | |
| 7 | 47.987 | 3.50 | 1.58144 | 40.8 |
| 8 | −9.780 | 1.50 | 1.84666 | 23.8 |
| 9 | −16.621 | variable | | |
| 10 | −32.315 | 2.45 | 1.80518 | 25.4 |
| 11 | −15.515 | 1.98 | | |
| 12 | −15.874 | 1.35 | 1.83400 | 37.2 |
| 13 | −92.008 | 3.02 | | |
| 14 | −10.988 | 1.43 | 1.83400 | 37.2 |
| 15 | −27.147 | | | |

TABLE 2

| d9 | 6.68 | 3.96 | 2.09 |
|---|---|---|---|
| FNo. | 1:3.9 | 1:5.4 | 1:7.4 |
| f | 36.10 | 50.00 | 68.00 |
| ω | 30.3° | 23.2° | 17.6° |
| fb | 11.23 | 22.89 | 37.89 |

TABLE 3

| | Second Surface |
|---|---|
| K | 0.00000000 |
| A4 | $0.32056853 \times 10^{-4}$ |
| A6 | $-0.35678084 \times 10^{-7}$ |
| A8 | $0.18623107 \times 10^{-7}$ |
| A10 | 0.00000000 |

$\Sigma dn = 27.06$ where $\Sigma dn$ is the total sum of d when d9 is measured at the telephoto end. Therefore, $L_L = \Sigma dn + fb = 64.95$ where $L_L$ is the overall length of the system, at the telephoto end.

$L_L/f_L = 0.955 < 1$

EXAMPLE 2

Figure 5:
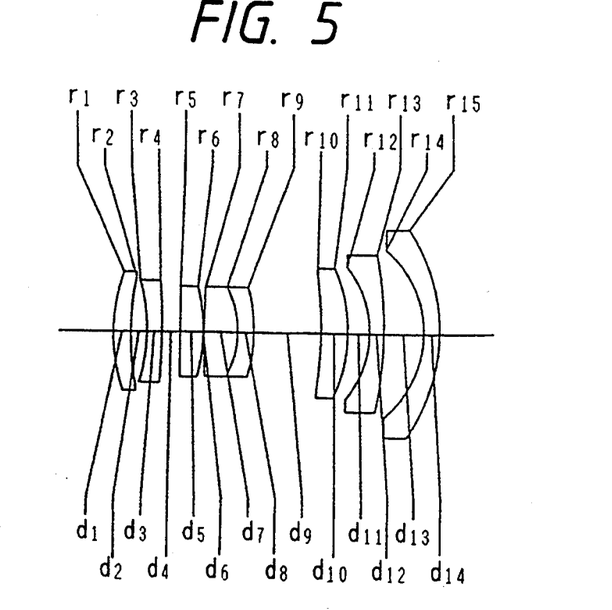
FIG. 5 is a simplified cross-sectional view showing the zoom lens system of Example 2 at the wide-angle end.
Figure 6:
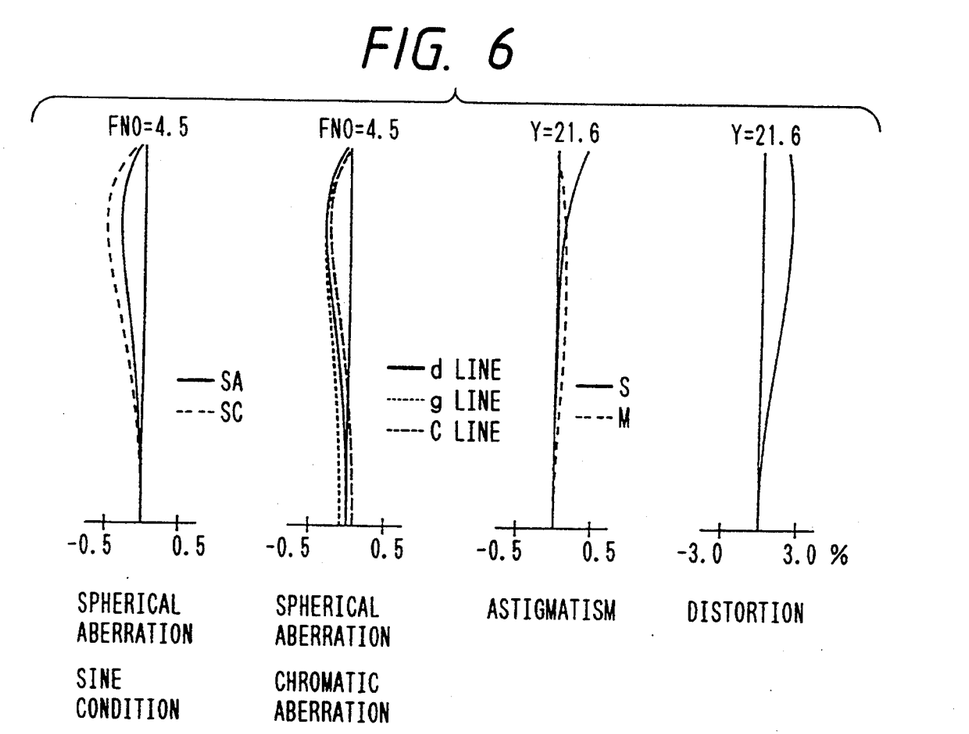
FIG. 6 is a set of graphs plotting the aberration curves obtained with the zoom lens system of Example 2 at the wide-angle end.
Figure 7:
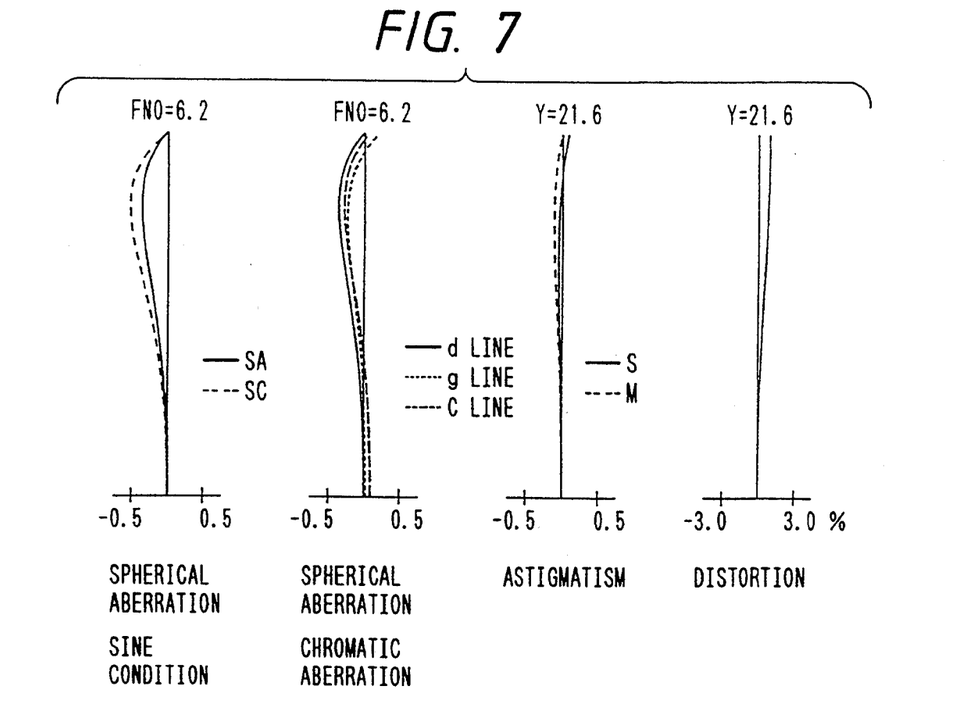
FIG. 7 is a set of graphs plotting the aberration curves obtained with the zoom lens system of Example 2 at the middle-angle end.
Figure 8:
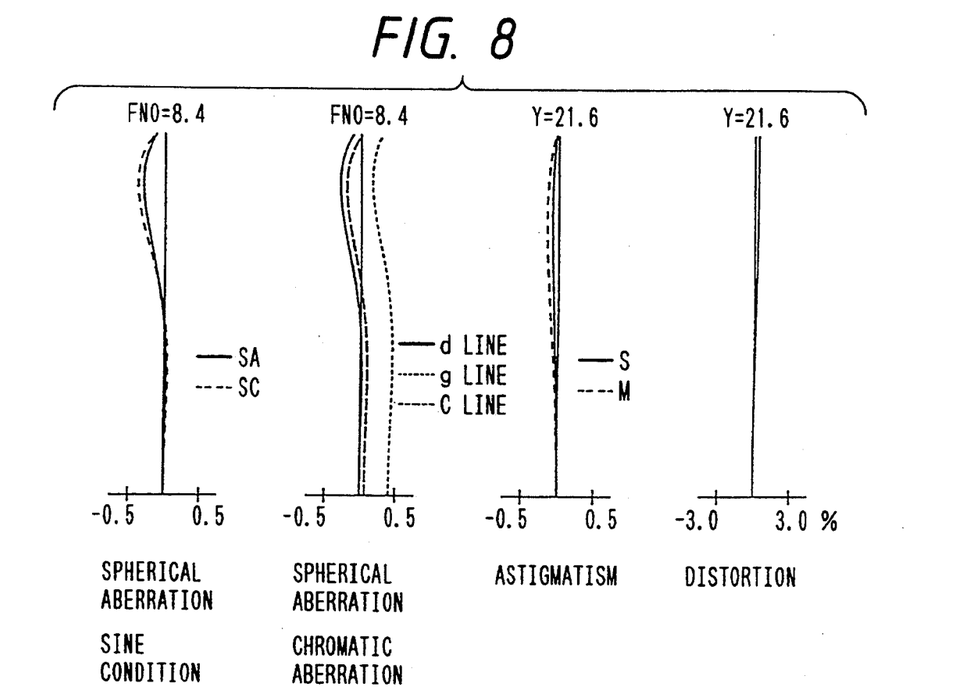
FIG. 8 is a set of graphs plotting the aberration curves obtained with the zoom lens system of Example 2 at the telephoto end.

FIG. 5 shows the zoom lens system according to example 2 of the present invention. Specific numerical data for this system are given in Tables 4 and 5. FIGS. 6, 7 and 8 are graphs plotting the aberration curves obtained with this system at the wide-angle end, the middle-angle end and the telephoto end, respectively.

In Example 2, the second and tenth surfaces are aspheric and the aspheric coefficients are listed in Table 6.

TABLE 4

| Surface No. | r | d | n | ν |
|---|---|---|---|---|
| 1 | 17.130 | 1.65 | 1.71300 | 53.8 |
| 2 | 29.623 | 1.44 | | |
| 3 | -16.542 | 1.40 | 1.78300 | 36.1 |
| 4 | -54.538 | 1.74 | | |
| 5 | -953.4-05 | 2.15 | 1.51742 | 52.4 |
| 6 | -16.088 | 0.10 | | |
| 7 | 87.900 | 3.05 | 1.57501 | 41.5 |
| 8 | -8.840 | 1.50 | 1.84666 | 23.8 |
| 9 | -14.882 | variable | | |
| 10 | -29.436 | 2.49 | 1.68893 | 31.1 |
| 11 | -14.413 | 2.04 | | |
| 12 | -9.697 | 1.35 | 1.77250 | 49.6 |
| 13 | -35.161 | 3.82 | | |
| 14 | -10.000 | 1.43 | 1.77250 | 49.6 |
| 15 | -17.141 | | | |

TABLE 5

| d9 | 6.25 | 3.80 | 2.11 |
|---|---|---|---|
| FNo. | 1:4.5 | 1:6.2 | 1:8.4 |
| f | 36.10 | 50.00 | 68.00 |
| ω | 30.4° | 23.2° | 17.6° |
| fb | 9.65 | 21.01 | 35.71 |

TABLE 6

| | Second Surface | | Tenth Surface |
|---|---|---|---|
| K | 0.00000000 | K | 0.00000000 |
| A4 | $0.44832392 \times 10^{-4}$ | A4 | $0.84290202 \times 10^{-4}$ |
| A6 | $-0.14375166 \times 10^{-6}$ | A6 | $0.83688793 \times 10^{-6}$ |
| A8 | $0.40975466 \times 10^{-7}$ | A8 | $0.42091055 \times 10^{-8}$ |
| A10 | 0.00000000 | A10 | 0.00000000 |

$\Sigma dn = 26.27$ $L_L = \Sigma dn + FB = 61.98$ $L_L/F_L = 0.991 < 1$

EXAMPLE 3

Figure 9:
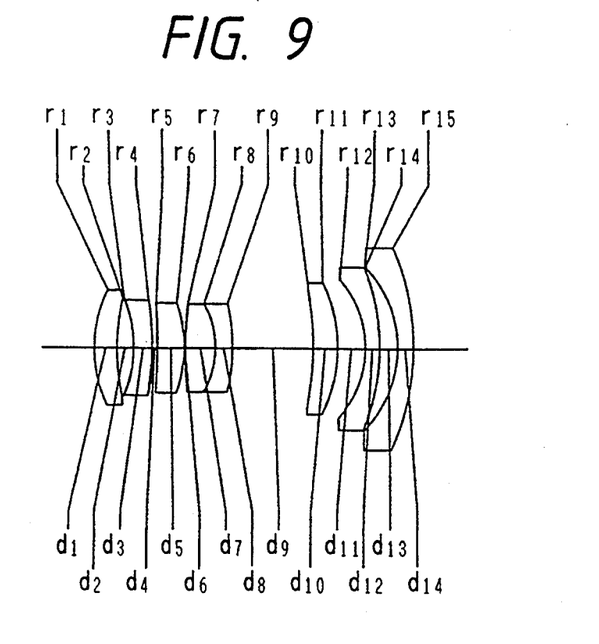
FIG. 9 is a simplified cross-sectional view showing the zoom lens system of Example 3 at the wide-angle end.
Figure 10:
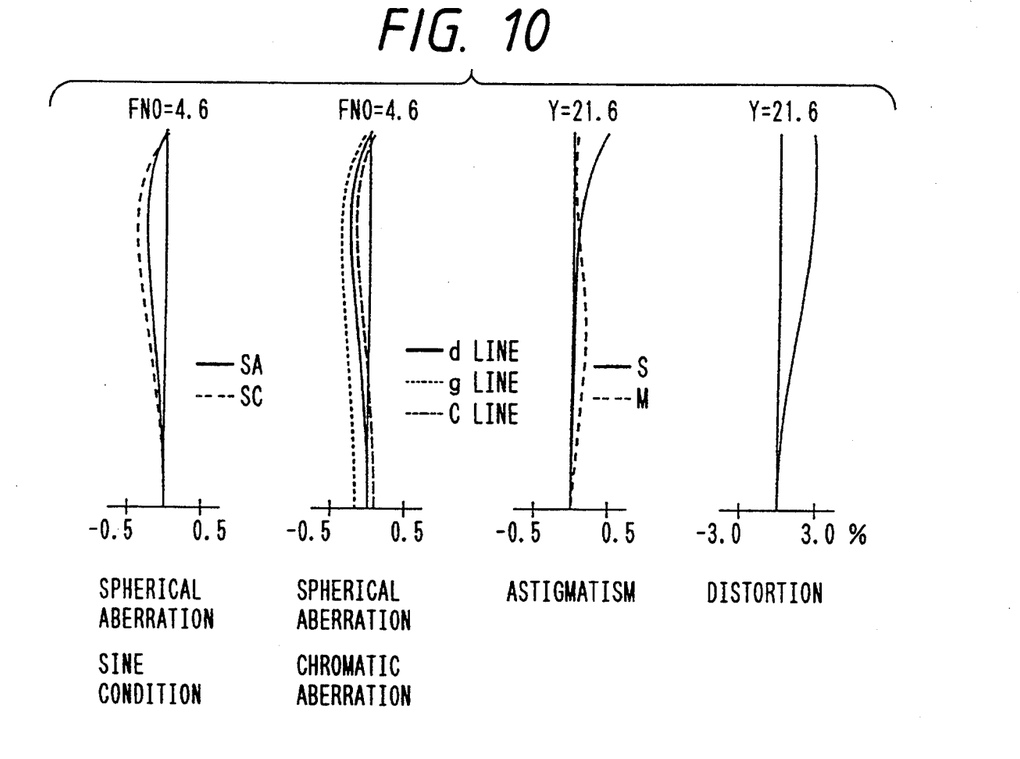
FIG. 10 is a set of graphs plotting the aberration curves obtained with the zoom lens system of Example 3 at the wide-angle end.
Figure 11:
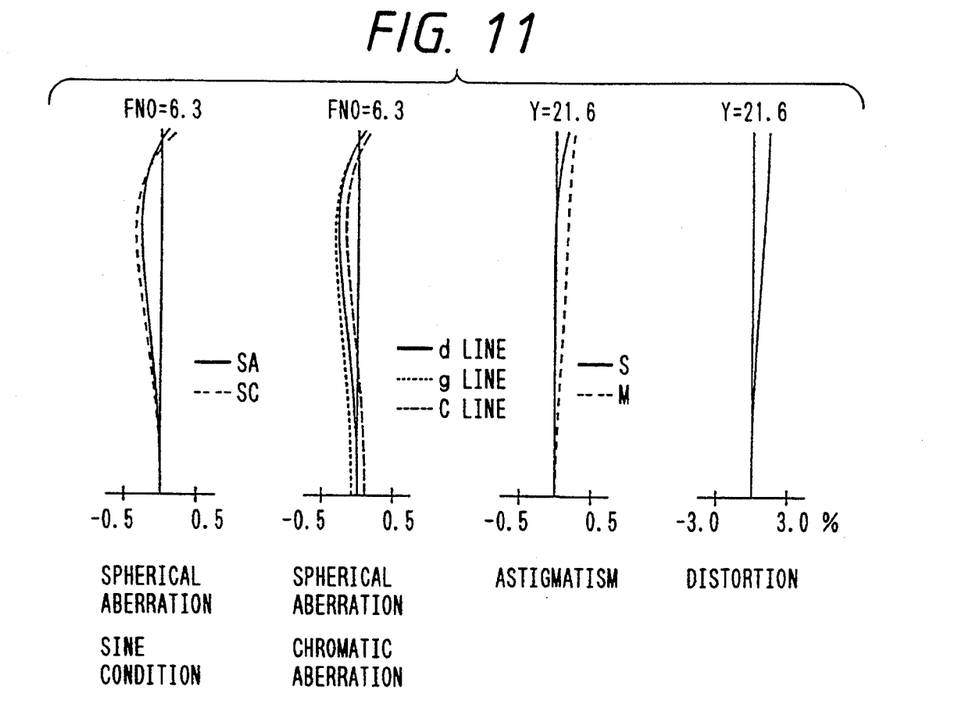
FIG. 11 is a set of graphs plotting the aberration curves obtained with the zoom lens system of Example 3 at the middle-angle end.
Figure 12:
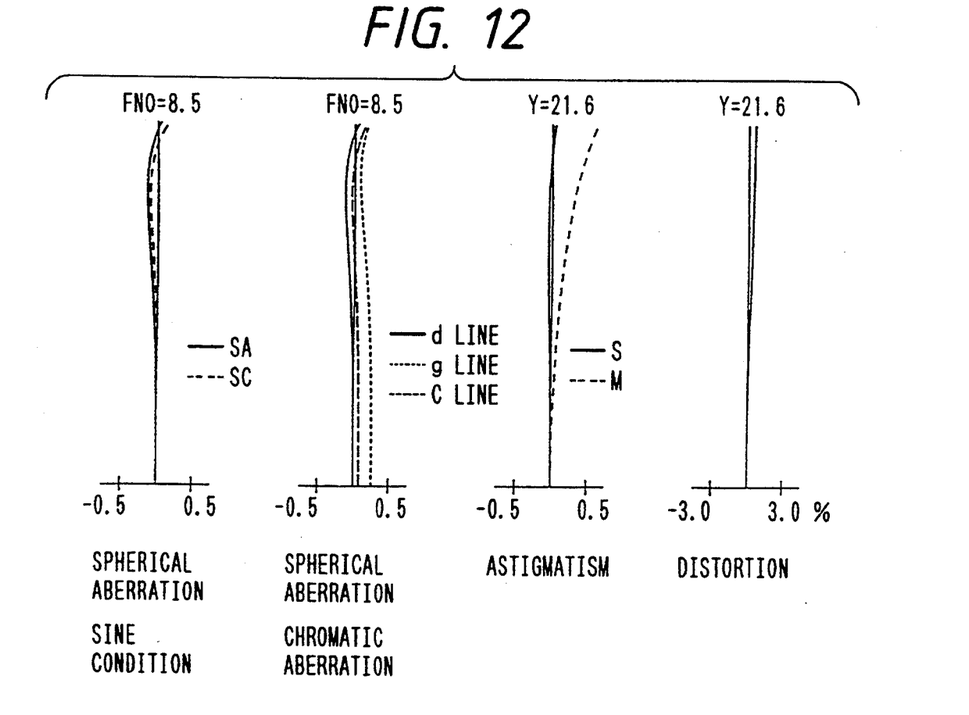
FIG. 12 is a set of graphs plotting the aberration curves obtained with the zoom lens system of Example 3 at the telephoto end.

FIG. 9 shows the zoom lens system according to example 3 of the present invention. Specific numerical data for this system are given in Tables 7 and 8. FIGS. 10, 11 and 12 are graphs plotting the aberration curves obtained with this system at the wide-angle end, the middle-angle end and the telephoto end, respectively.

In example 3, the tenth surface is aspheric and its aspheric coefficients are listed in Table 9.

TABLE 7

| Surface No. | r | d | n | ν |
|---|---|---|---|---|
| 1 | 12.252 | 2.15 | 1.54072 | 47.2 |
| 2 | 19.524 | 1.54 | | |
| 3 | -11.734 | 1.74 | 1.84666 | 23.8 |
| 4 | -26.546 | 0.50 | | |
| 5 | -53.292 | 2.59 | 1.53172 | 48.9 |
| 6 | -11.845 | 0.10 | | |
| 7 | 41.762 | 2.80 | 1.56732 | 42.8 |
| 8 | -8.050 | 1.63 | 1.83400 | 37.2 |
| 9 | -16.685 | variable | | |
| 10 | -23.722 | 2.29 | 1.58547 | 29.9 |
| 11 | -13.547 | 2.64 | | |
| 12 | -9.495 | 1.33 | 1.77250 | 49.6 |
| 13 | -19.558 | 1.66 | | |
| 14 | -10.925 | 1.44 | 1.83481 | 42.7 |
| 15 | -23.115 | | | |

TABLE 8

| d9 | 7.61 | 4.91 | 3.05 |
|---|---|---|---|
| FNo. | 1:4.6 | 1:6.3 | 1:8.5 |
| f | 36.10 | 50.00 | 68.00 |
| ω | 30.3° | 23.1° | 17.6° |
| fb | 10.19 | 21.54 | 36.22 |

TABLE 9

| | Tenth Surface |
|---|---|
| K | 0.00000000 |
| A4 | $0.76579924 \times 10^{-4}$ |
| A6 | $0.18523552 \times 10^{-5}$ |
| A8 | $-0.10443598 \times 10^{-7}$ |
| A10 | 0.00000000 |

$\Sigma dn = 25.46$ $L_L = \Sigma d + fb = 61.68$ $L_L/f_L = 0.907 < 1$

EXAMPLE 4

Figure 13:
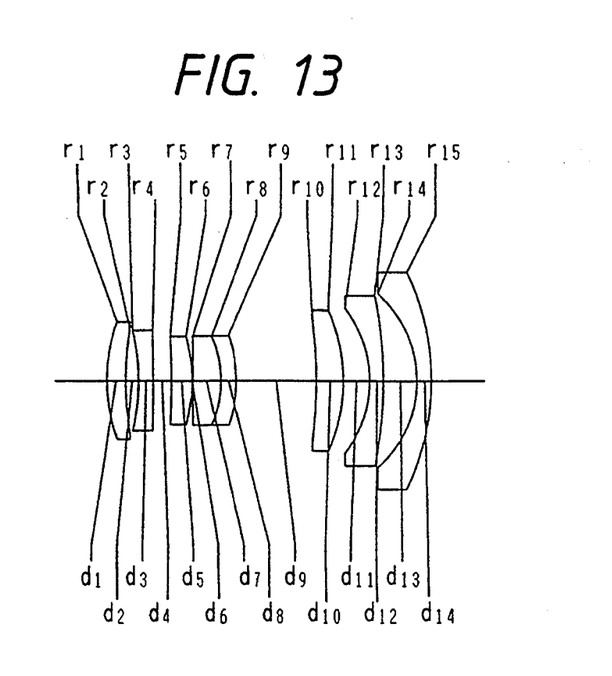
FIG. 13 is a simplified cross-sectional view showing the zoom lens system of Example 4 at the wide-angle end.

FIG. 13 shows the zoom lens system according to example 4 of the present invention. Specific numerical data for this system are given in Tables 10 and 11.

Figure 14:
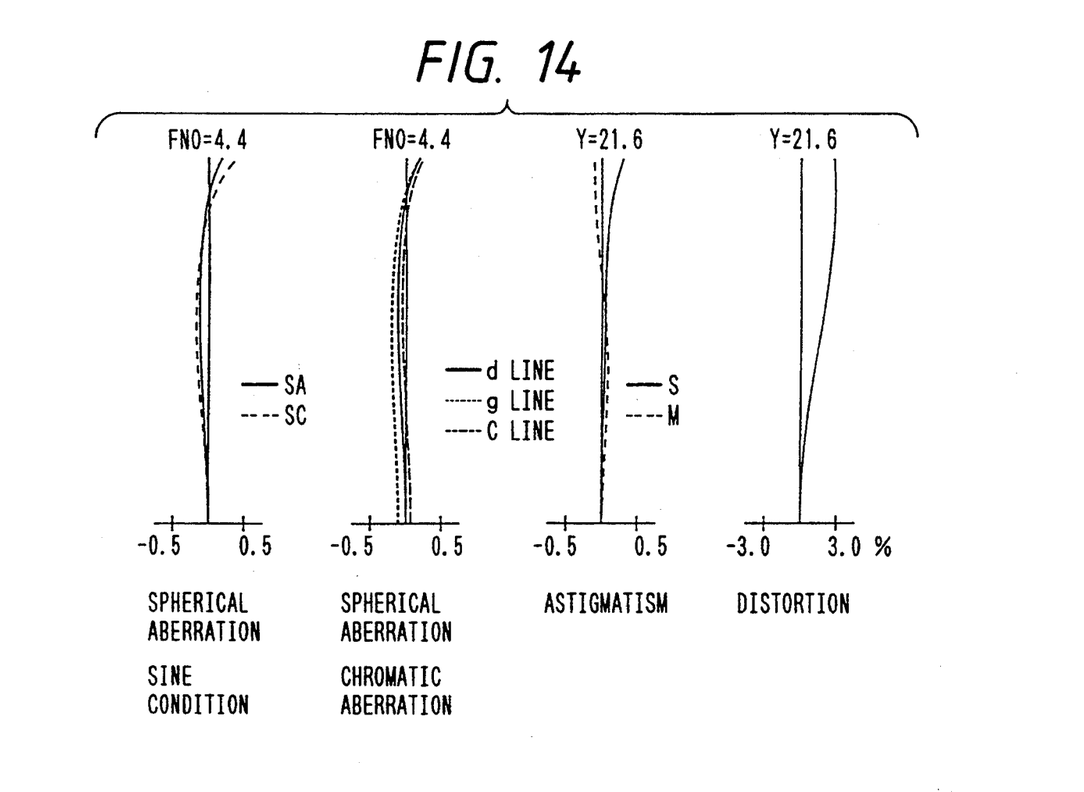
FIG. 14 is a set of graphs plotting the aberration curves obtained with the zoom lens system of Example 4 at the wide-angle end.
Figure 15:
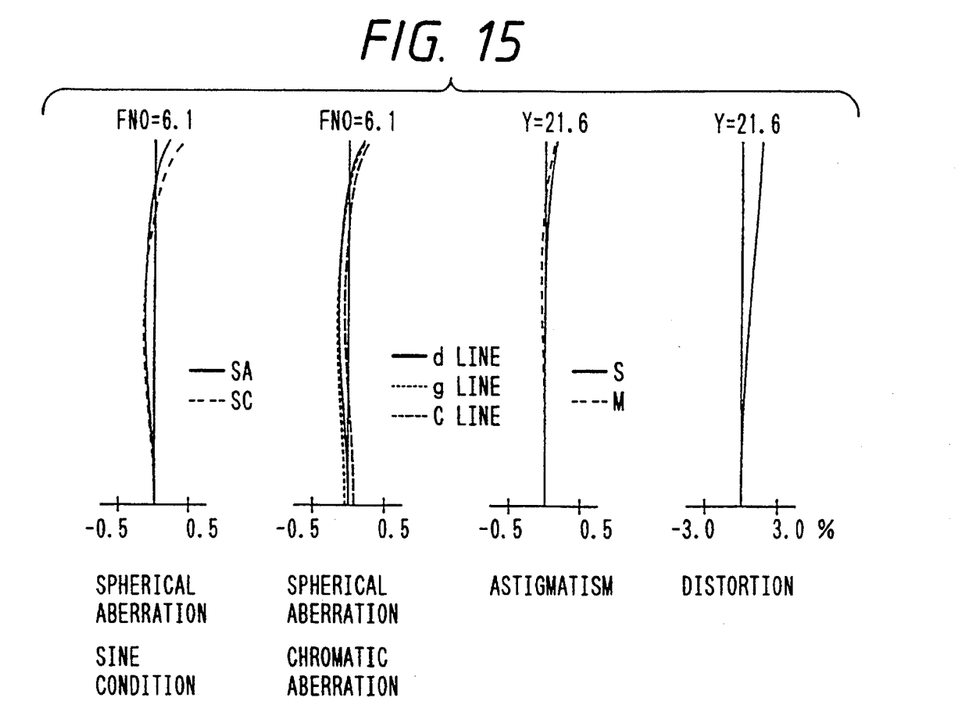
FIG. 15 is a set of graphs plotting the aberration curves obtained with the zoom lens system of Example 4 at the middle-angle end.
Figure 16:
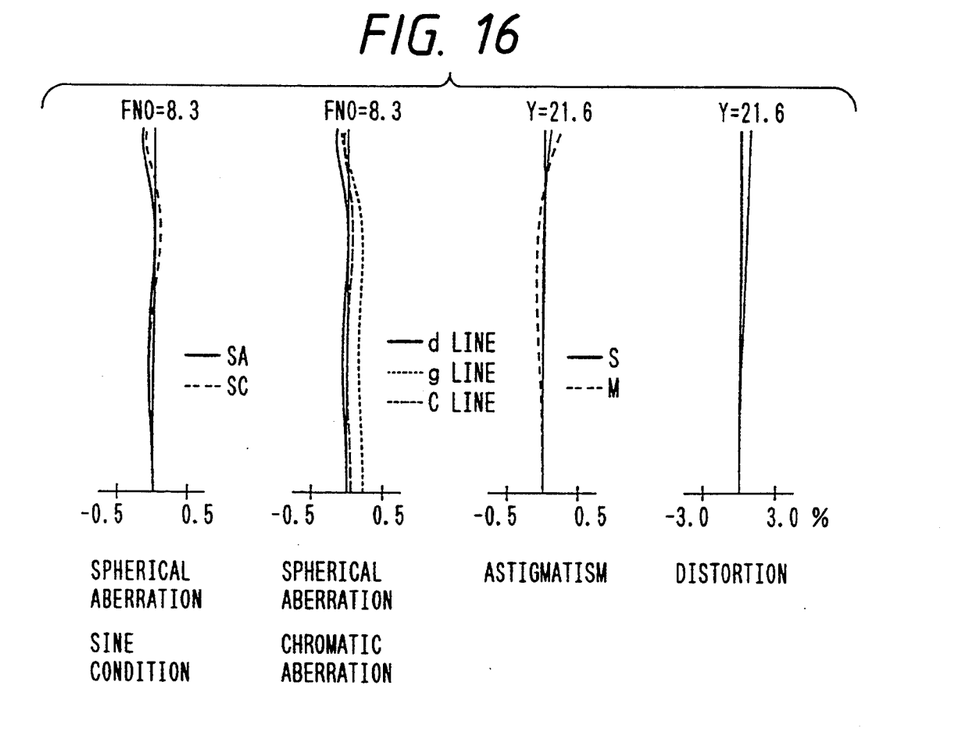
FIG. 16 is a set of graphs plotting the aberration curves obtained with the zoom lens system of Example 4 at the telephoto end.

FIGS. 14, 15 and 16 are graphs plotting the aberration curves obtained with this system at the wide-angle end, the middle-angle end and the telephoto end, respectively.

In example 4, the fourth and tenth surfaces are aspheric and their aspheric coefficients are listed in Table 12.

TABLE 10

| Surface No. | r | d | n | ν |
|---|---|---|---|---|
| 1 | 16.532 | 1.85 | 1.53172 | 48.9 |
| 2 | 32.843 | 1.28 | | |
| 3 | −18.916 | 1.39 | 1.73077 | 40.5 |
| 4 | −74.920 | 1.79 | | |
| 5 | −66.046 | 2.03 | 1.48749 | 70.2 |
| 6 | −15.222 | 0.10 | | |
| 7 | −317.259 | 2.78 | 1.51633 | 64.1 |
| 8 | −10.337 | 1.48 | 1.84666 | 23.8 |
| 9 | −12.937 | variable | | |
| 10 | −33.749 | 2.65 | 1.58547 | 29.9 |
| 11 | −15.581 | 2.59 | | |
| 12 | −11.092 | 1.33 | 1.72000 | 50.3 |
| 13 | −38.299 | 3.21 | | |
| 14 | −10.954 | 1.42 | 1.67790 | 50.7 |
| 15 | −23.249 | | | |

TABLE 11

| d9 | 7.93 | 4.97 | 2.93 |
|---|---|---|---|
| FNo. | 1:4.4 | 1:6.1 | 1:8.3 |
| f | 36.10 | 50.00 | 68.00 |
| ω | 30.3° | 23.1° | 17.5° |
| fb | 9.21 | 20.69 | 35.56 |

TABLE 12

| Fourth Surface | | Tenth Surface | |
|---|---|---|---|
| K | 0.00000000 | K | 0.00000000 |
| A4 | $0.10627284 \times 10^{-3}$ | A4 | $0.57738292 \times 10^{-4}$ |
| A6 | $0.20889839 \times 10^{-5}$ | A6 | $0.12299472 \times 10^{-5}$ |
| A8 | $-0.78624126 \times 10^{-7}$ | A8 | $-0.79635417 \times 10^{-8}$ |
| A10 | $0.19229557 \times 10^{-8}$ | A10 | 0.00000000 |

$\Sigma dn = 26.83$ $L_L = \Sigma dn + fb = 62.39$ $L_L / 5_L = 0.918 < 1$

EXAMPLE 5

Figure 17:
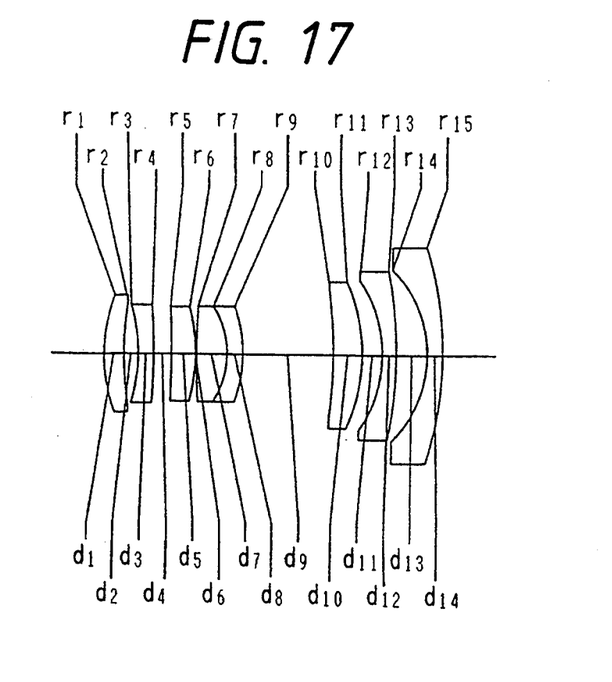
FIG. 17 is a simplified cross-sectional view showing the zoom lens system of Example 5 at the wide-angle end.
Figure 18:
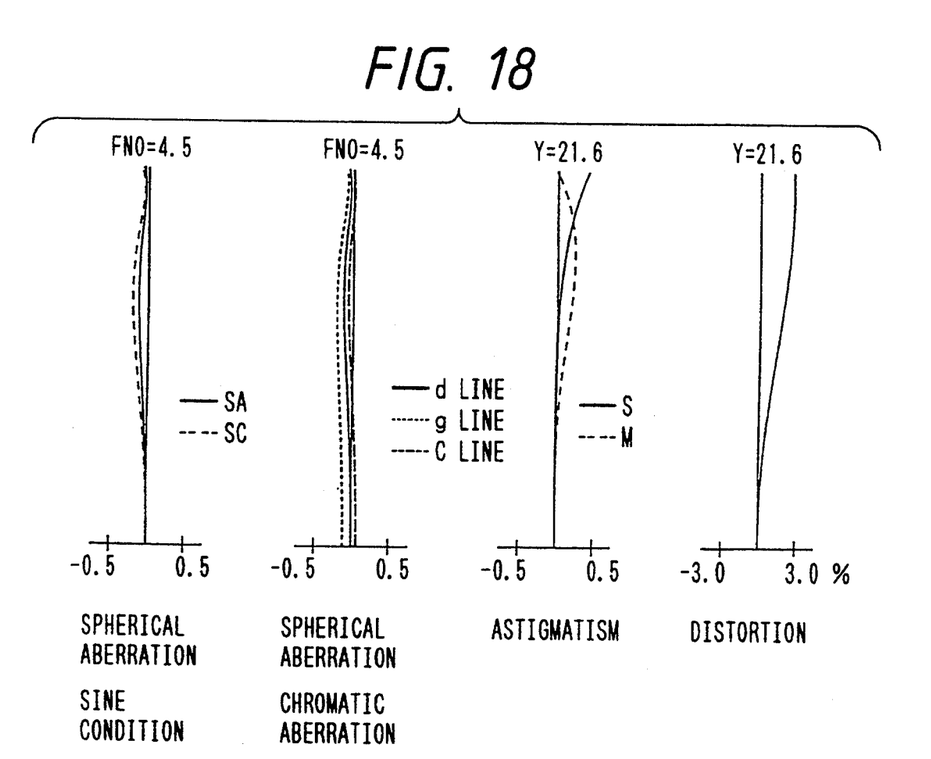
FIG. 18 is a set of graphs plotting the aberration curves obtained with the zoom lens system of Example 5 at the wide-angle end.
Figure 19:
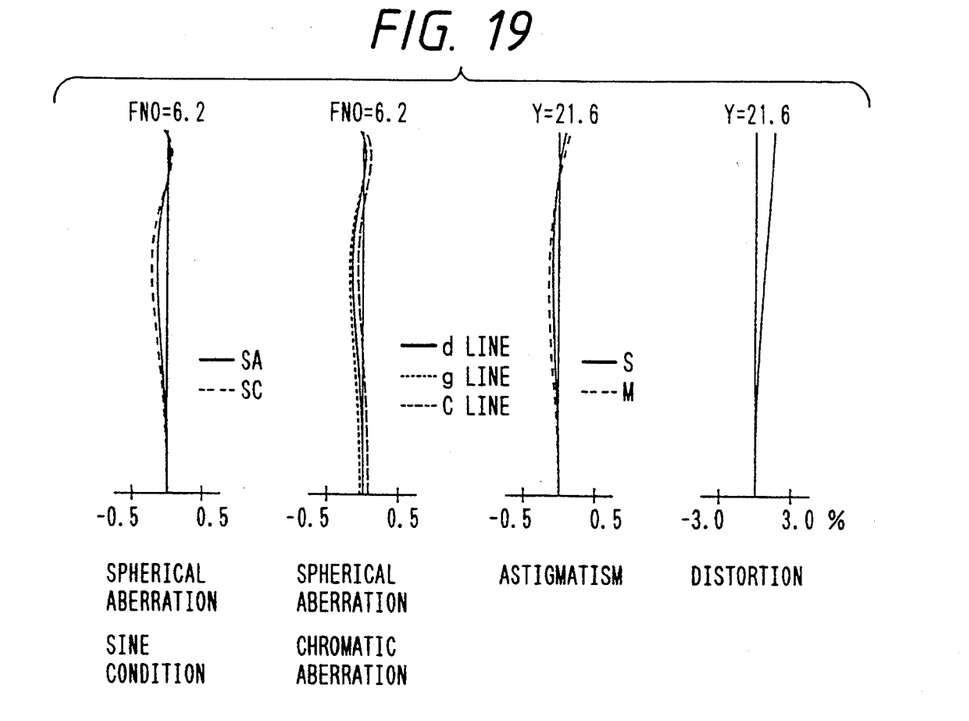
FIG. 19 is a set of graphs plotting the aberration curves obtained with the zoom lens system of Example 5 at the middle-angle end.
Figure 20:
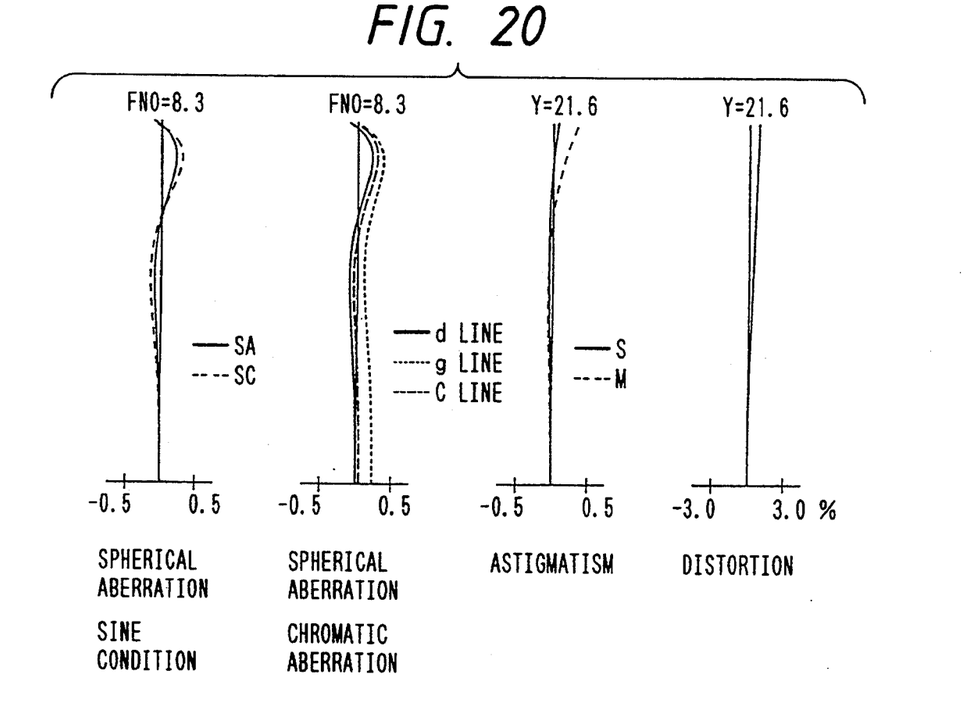
FIG. 20 is a set of graphs plotting the aberration curves obtained with the zoom lens system of Example 5 at the telephoto end.

FIG. 17 shows the zoom lens system of example 5 of the present invention. Specific numerical data for this system are given in Tables 13 and 14. FIGS. 18, 19 and 20 are graphs plotting the aberration curves obtained with this system at the wide-angle end, the middle-angle end and the telephoto end, respectively.

In example 5, the fifth and tenth surfaces are aspheric and their aspheric coefficients are listed in Table 15.

TABLE 13

| Surface No. | r | d | n | ν |
|---|---|---|---|---|
| 1 | 14.554 | 1.91 | 1.48749 | 70.2 |
| 2 | 30.328 | 1.36 | | |
| 3 | −14.876 | 1.39 | 1.83400 | 37.2 |
| 4 | −57.405 | 1.65 | | |
| 5 | −92.253 | 2.27 | 1.58913 | 61.2 |
| 6 | −16.453 | 0.10 | | |
| 7 | 73.857 | 2.86 | 1.51454 | 54.7 |

TABLE 13-continued

| Surface No. | r | d | n | ν |
|---|---|---|---|---|
| 8 | −7.967 | 1.49 | 1.83400 | 37.2 |
| 9 | −12.334 | variable | | |
| 10 | −33.816 | 2.68 | 1.58547 | 29.9 |
| 11 | −16.114 | 1.89 | | |
| 12 | −12.069 | 1.33 | 1.48749 | 70.2 |
| 13 | −37.534 | 2.95 | | |
| 14 | −10.954 | 1.42 | 1.83481 | 42.7 |
| 15 | −32.374 | | | |

TABLE 14

| d | 8.60 | 5.67 | 3.66 |
|---|---|---|---|
| FNo. | 1:4.4 | 1:6.2 | 1:8.3 |
| f | 36.10 | 50.00 | 68.00 |
| ω | 30.3° | 23.1° | 17.5° |
| fb | 9.97 | 21.20 | 35.75 |

TABLE 15

| Fifth Surface | | Tenth Surface | |
|---|---|---|---|
| K | 0.00000000 | K | 0.00000000 |
| A4 | $-0.52927814 \times 10^{-4}$ | A4 | $0.72478854 \times 10^{-4}$ |
| A6 | $0.69987984 \times 10^{-6}$ | A6 | $0.18865377 \times 10^{-6}$ |
| A8 | $-0.68925287 \times 10^{-7}$ | A8 | $0.54614578 \times 10^{-8}$ |
| A10 | $0.23745056 \times 10^{-8}$ | A10 | 0.00000000 |

$\Sigma dn = 26.96$ $L_L = \Sigma dn + fb = 62.71$ $L_L / f_L = 0.922$

Table 16 shows how condition (1)–(12) are satisfied in Examples 1–5.

TABLE 16

| | | Ex. 1 | Ex. 2 | Ex. 3 | Ex. 4 | Ex. 5 |
|---|---|---|---|---|---|---|
| 1 | fw/f1 | 1.76 | 1.83 | 1.74 | 1.67 | 1.66 |
| 2 | fw/f2 | 2.10 | 2.24 | 2.13 | 2.03 | 2.06 |
| 3 | ΔL/(ft-fw) | 0.144 | 0.130 | 0.143 | 0.157 | 0.155 |
| 4 | r1/fw | 0.523 | 0.475 | 0.339 | 0.458 | 0.403 |
| 5 | r3/fw | −0.467 | −0.458 | −0.325 | −0.524 | −0.412 |
| 6 | r6/fw | −0.599 | −0.446 | −0.328 | −0.422 | −0.456 |
| 7 | rc/fw | −0.271 | −0.245 | −0.223 | −0.286 | −0.221 |
| 8 | Δl1 | −7.6 | −10.2 | — | −24.4 | −11.3 |
| 9 | r22/fw | −0.430 | −0.399 | −0.375 | −0.432 | −0.446 |
| 10 | r23/fw | −0.440 | −0.269 | −0.263 | −0.307 | −0.334 |
| 11 | r25/fw | −0.304 | −0.277 | −0.303 | −0.303 | −0.303 |
| 12 | ΔV2 | — | 0.062 | 0.085 | 0.067 | 0.104 |

I claim:

1. A zoom lens system comprising, in order from the object side:

a positive first lens group and a negative second lens group, said first lens group and second lens groups adjusting a magnification factor of the zoom lens system by varying a distance therebetween, said first lens group comprises, in order from the object side, a first positive meniscus lens element having a convex surface that is directed toward an object, a first negative meniscus lens element having a concave surface that is directed toward the object, a second positive lens element having a convex surface that is directed toward an image plane, and a positive cemented lens which includes a third positive lens element and a second negative lens element, said third positive lens element being cemented to a concave surface of said second negative lens element that is directed toward the object; said first and second lens groups satisfying the following conditions;

$1.59 < fw/f1 < 2.0$, and $1.79 < fw/|f2| < 2.5$ where fw represents a focal length of the overall zoom lens system at a wide-angle end, f1 represents a focal length of said first lens group, and f2 represents a focal length of said second lens group.

2. A zoom lens system according to claim 1, wherein said first lens group satisfies the following conditions:

$0.25 < r1/fw < 0.7$, $-0.7 < r3/fw < -0.25$, $-0.9 < r6/fw < -0.25$, and $-0.5 < rc/fw < -0.15$;

where Ri represents a radius of curvature of an ith lens surface as counted from an object side; and rc represents a radius of curvature of said concave surface of said second negative lens element that is cemented to said third positive lens element, i being an integer.

3. A zoom lens system according to claim 1, wherein said first lens group includes a lens element that satisfies the following condition:

$-30 < \Delta I1 < 0$;

where $\Delta I1$ represents an amount of variation in a spherical aberration coefficient due to an aspheric surface in the first lens group when an overall focal length of said zoom lens system at a wide-angle end equals unity.

4. A zoom lens system according to claim 1, wherein said second lens group comprises, in order from the object side, a first positive meniscus lens element having a convex surface directed toward an image plane and first and second negative meniscus lens elements, each having a concave surface directed toward an object, said second lens group satisfying the following conditions:

$-0.7 < r22/fw < -0.25$, $-0.7 < r23/fw < -0.19$, and $-0.7 < r25/fw < -0.19$;

where r2i represents a radius of curvature of an ith lens surface in the second lens group as counted from an object side.

5. A zoom lens system according to claim 4, wherein said first positive meniscus lens element in said second group is a plastic lens element.

6. A zoom lens system as claimed in claim 1, wherein said first and second lens groups satisfy the following condition:

$0.09 < \Delta L/(ft-fw) < 0.25$;

where $\Delta L$ represents an amount of variation in a distance between the first and second lens groups during a zooming operation and ft represents a focal length of the overall zoom lens system when at a telephoto end.

7. A zoom lens system comprising, in order from the object side:

a positive first lens group and a negative second lens group, said first lens group and second lens groups adjusting a magnification factor of the zoom lens system by varying a distance therebetween, said first lens group comprises, in order from the object side, a first positive meniscus lens element having a convex surface that is directed toward an object, a first negative lens element having a concave surface that is directed toward the object, a second positive lens element having a convex surface that is directed toward an image plane and separated from said first negative lens element by an air gap, and a positive cemented lens which includes a third positive lens element and a second negative lens element, said third positive lens element being cemented to a concave surface of said second negative lens element that is directed toward the object; said first and second lens groups satisfying the following conditions:

$1.59 < fw/f1 < 2.0$, and $1.79 < fw/|f2| < 2.5$ where fw represents a focal length of the overall zoom lens system at a wide-angle end, f1 represents a focal length of said first lens group, and f2 represents a focal length of said second lens group.

8. A zoom lens system comprising, in order from the object side:

a positive first lens group and a negative second lens group, said first lens group and second lens groups adjusting a magnification factor of the zoom lens system by varying a distance therebetween, said first and second lens groups satisfying the following conditions:

$1.59 < fw/f1 < 2.0$, and $1.79 < fw/|f2| < 2.5$ where fw represents a focal length of the overall zoom lens system at a wide-angle end, f1 represents a focal length of said first lens group, and f2 represents a focal length of said second lens group;

said second lens group comprises, in order from the object side, a first positive meniscus lens element having a convex surface directed toward an image plane and first and second negative meniscus lens elements, each having a concave surface directed toward an object, said second lens group satisfying the following conditions:

$-0.7 < r22/fw < -0.25$ $-0.7 < r23/fw < -0.19$, and $-0.7 < r25/fw < -0.19$;

where r2i represents a radius of curvature of an ith lens surface in the second lens group as counted from an object side, i being an integer;

said first positive meniscus lens element having a concave surface directed toward the object, which is an aspheric surface that satisfies the following condition:

$0 < \Delta V2 < 0.2$;

where $\Delta V2$ represents an amount of variation in a coefficient of distortion due to the aspheric surface in the second lens group when an overall focal length of the zoom lens system at the wide angle end equals unity.

* * * * *